United States Patent
Löhr et al.

(10) Patent No.: US 12,495,454 B2
(45) Date of Patent: Dec. 9, 2025

(54) SIDELINK DISCONTINUOUS RECEPTION CONFIGURATION

(71) Applicant: LENOVO (BEIJING) LIMITED, Beijing (CN)

(72) Inventors: Joachim Löhr, Wiesbaden (DE); Prateek Basu Mallick, Dreieich (DE); Jing Han, Beijing (CN); Dimitrios Karampatsis, Ruislip (GB); Jie Hu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 348 days.

(21) Appl. No.: 18/547,854

(22) PCT Filed: Feb. 24, 2021

(86) PCT No.: PCT/CN2021/077639
§ 371 (c)(1),
(2) Date: Aug. 24, 2023

(87) PCT Pub. No.: WO2022/178713
PCT Pub. Date: Sep. 1, 2022

(65) Prior Publication Data
US 2024/0196455 A1    Jun. 13, 2024

(51) Int. Cl.
*H04W 76/14*    (2018.01)
*H04W 28/02*    (2009.01)
(Continued)

(52) U.S. Cl.
CPC ....... *H04W 76/14* (2018.02); *H04W 28/0268* (2013.01); *H04W 76/28* (2018.02); *H04W 92/18* (2013.01)

(58) Field of Classification Search
CPC ............ H04W 24/08; H04W 28/0268; H04W 52/0216; H04W 76/14; H04W 76/28; H04W 92/18
See application file for complete search history.

(56) References Cited

U.S. PATENT DOCUMENTS

| 2021/0051588 A1 | 2/2021 | Wu et al. | |
| 2023/0247553 A1* | 8/2023 | Zheng | H04W 76/28 |
| | | | 370/311 |
| 2023/0284332 A1* | 9/2023 | Zhang | H04W 76/28 |
| | | | 370/328 |

FOREIGN PATENT DOCUMENTS

| CN | 111556590 A | 8/2020 |
| CN | 111918401 A | 11/2020 |

(Continued)

OTHER PUBLICATIONS

Vivo, "DRX Alignment between TX and RX UEs", 3GPP TSG-RAN WG2 Meeting #113 electronic R2-2100796, Jan. 25-Feb. 5, 2021, pp. 1-6.

(Continued)

*Primary Examiner* — Thomas R Cairns
(74) *Attorney, Agent, or Firm* — Kunzler Bean & Adamson

(57) ABSTRACT

Apparatuses, methods, and systems are disclosed for sidelink discontinuous reception configuration. One method (800) includes initiating (802), by a first user equipment, a sidelink unicast establishment procedure with a second user equipment. The method (800) includes performing (804) sidelink communication using a predetermined sidelink discontinuous reception configuration during the sidelink unicast establishment procedure. The method (800) includes, in response to receiving a direct communication accept mes- (Continued)

sage, performing (806) sidelink communication based on a set of sidelink discontinuous reception configurations.

20 Claims, 9 Drawing Sheets

(51) Int. Cl.
*H04W 76/28* (2018.01)
*H04W 92/18* (2009.01)

(56) References Cited

FOREIGN PATENT DOCUMENTS

| | | | |
|---|---|---|---|
| CN | 112399601 A | 2/2021 | |
| EP | 4216637 A1 * | 7/2023 | ............ H04W 76/14 |
| WO | 2021029672 A1 | 2/2021 | |

OTHER PUBLICATIONS

LG Electronics, "Wid revision: NR sidelink enhancement", 3GPP TSG RAN Meeting #89e RP-201516, Sep. 14-18, 2020, pp. 1-6.

3GPP, "3rd Generation Partnership Project; Technical Specification Group Radio Access Network; NR; Radio Resource Control (RRC) protocol specification (Release 16)", 3GPP TS 38.331 V16.1.0, Jul. 2020, pp. 1-906.

PCT/CN2021/077639, "International Search Report and the Written Opinion of the International Searching Authority, or the Declaration", International Searching Authority, Nov. 22, 2021, pp. 1-6.

OPPO, "Discussion on DRX for sidelink", 3GPP TSG-RAN WG2 #112-e R2-2008772, Nov. 2020, pp. 1-7.

Thomson et al., "IPv6 Stateless Address Autoconfiguration", RFC 4862, Network Working Group, Sep. 2007, pp. 1-30.

3GPP, "3rd Generation Partnership Project; Technical Specification Group Services and System Aspects; Architecture enhancements for 5G System (5GS) to support Vehicle-to-Everything (V2X) services (Release 16)", 3GPP TS 23.287 V16.5.0, Dec. 2020, pp. 1-58.

3GPP, "3rd Generation Partnership Project; Technical Specification Group Services and System Aspects; Security aspects of 3GPP support for advanced Vehicle-to-Everything (V2X) services (Release 16)", 3GPP TS 33.536 V16.2.0, Dec. 2020, pp. 1-24.

3GPP, "3rd Generation Partnership Project; Technical Specification Group Radio Access Network; NR; Physical channels and modulation (Release 16)", 3GPP TS 38.211 V16.4.0, Dec. 2020, pp. 1-133.

3GPP, "3rd Generation Partnership Project; Technical Specification Group Radio Access Network; NR; Physical layer procedures for control (Release 16)", 3GPP TS 38.213 V16.4.0, Dec. 2020, pp. 1-181.

3GPP, "3rd Generation Partnership Project; Technical Specification Group Radio Access Network; NR; Physical layer procedures for data (Release 16)", 3GPP TS 38.214 V16.4.0, Dec. 2020, pp. 1-169.

3GPP, "3rd Generation Partnership Project; Technical Specification Group Radio Access Network; NR; NR and NG-RAN Overall Description; Stage 2 (Release 16)", 3GPP TS 38.300 V16.4.0, Dec. 2020, pp. 1-149.

3GPP, "3rd Generation Partnership Project; Technical Specification Group Radio Access Network; NR; Medium Access Control (MAC) protocol specification (Release 16)", 3GPP TS 38.321 V16.3.0, Dec. 2020, pp. 1-156.

* cited by examiner

SIDELINK DISCONTINUOUS RECEPTION CONFIGURATION

FIELD

The subject matter disclosed herein relates generally to wireless communications and more particularly relates to sidelink discontinuous reception configuration.

BACKGROUND

In certain wireless communications networks, discontinuous reception may be used during sidelink communication. A user equipment may not know a discontinuous reception configuration to use for certain sidelink communications.

BRIEF SUMMARY

Methods for sidelink discontinuous reception configuration are disclosed. Apparatuses and systems also perform the functions of the methods. In one embodiment, the method includes initiating, by a first user equipment, a sidelink unicast establishment procedure with a second user equipment. In certain embodiments, the method includes performing sidelink communication using a predetermined sidelink discontinuous reception configuration during the sidelink unicast establishment procedure. In various embodiments, the method includes, in response to receiving a direct communication accept message, performing sidelink communication based on a set of sidelink discontinuous reception configurations.

An apparatus for sidelink discontinuous reception configuration, in one embodiment, includes a first user equipment. In some embodiments, the apparatus includes a processor that: initiates a sidelink unicast establishment procedure with a second user equipment; performs sidelink communication using a predetermined sidelink discontinuous reception configuration during the sidelink unicast establishment procedure; and, in response to receiving a direct communication accept message, performs sidelink communication based on a set of sidelink discontinuous reception configurations.

In various embodiments, a method for sidelink discontinuous reception configuration includes receiving information, at a second user equipment, indicating initiation of a sidelink unicast establishment procedure with a first user equipment. In certain embodiments, the method includes performing sidelink communication using a predetermined sidelink discontinuous reception configuration during the sidelink unicast establishment procedure. In various embodiments, the method includes, in response to transmitting a direct communication accept message, performing sidelink communication based on a set of sidelink discontinuous reception configurations.

An apparatus for sidelink discontinuous reception configuration, in some embodiments, includes a second user equipment. In some embodiments, the apparatus further includes a receiver that receives information indicating initiation of a sidelink unicast establishment procedure with a first user equipment. In various embodiments, the apparatus further includes a processor that: performs sidelink communication using a predetermined sidelink discontinuous reception configuration during the sidelink unicast establishment procedure; and, in response to transmitting a direct communication accept message, performs sidelink communication based on a set of sidelink discontinuous reception configurations.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
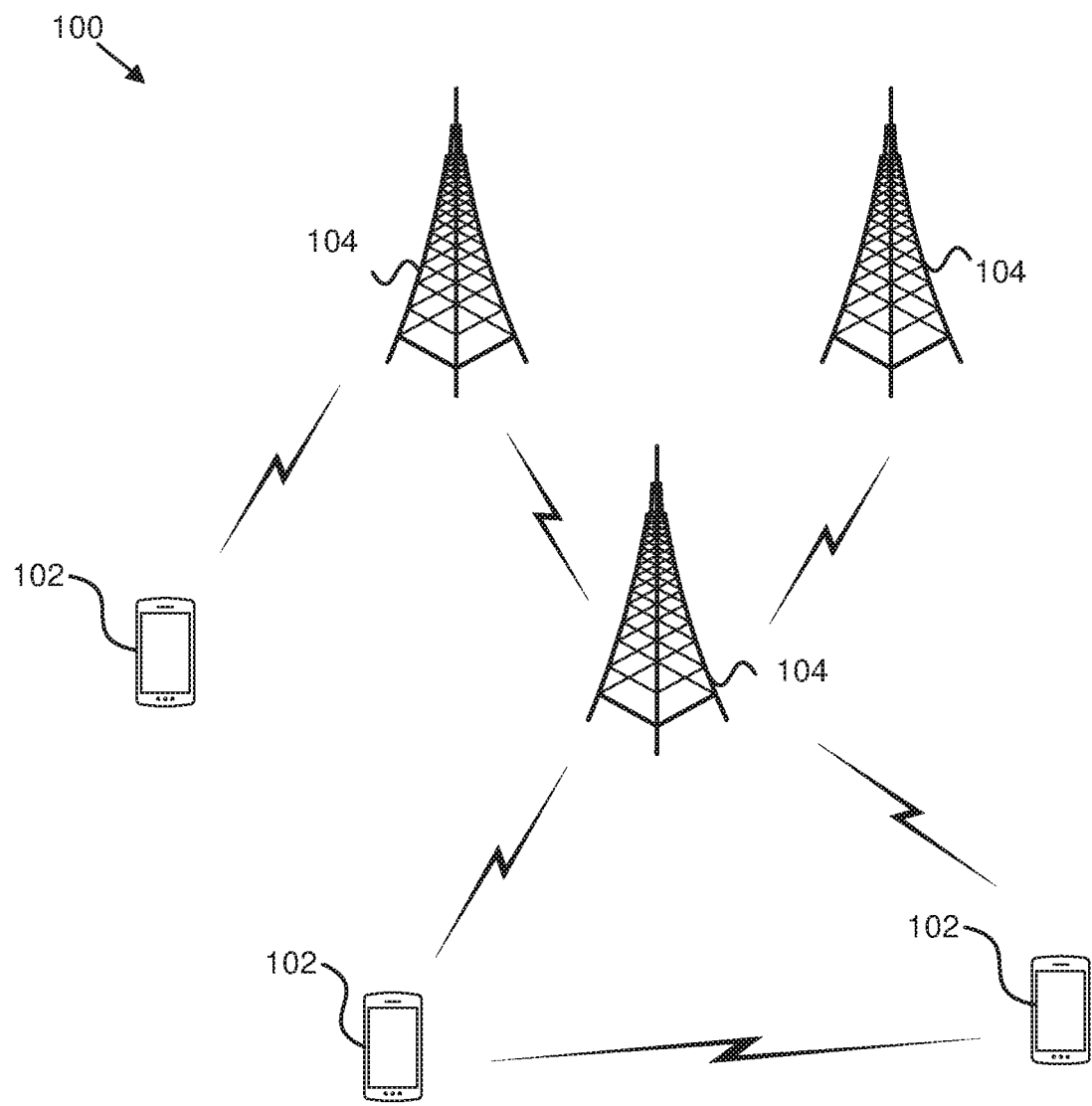
FIG. 1 is a schematic block diagram illustrating one embodiment of a wireless communication system for sidelink discontinuous reception configuration.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for sidelink discontinuous reception configuration. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle on-board computers, network devices (e.g., routers, switches, modems), IoT devices, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, user equipment ("UE"), user terminals, a device, or by other terminology used in the art. The remote units 102 may communicate directly with one or more of the network units 104 via uplink ("UL") communication signals and/or the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In various embodiments, a remote unit 102 (e.g., a first user equipment) may initiate a sidelink unicast establishment procedure with a second user equipment (e.g., remote unit 102). In certain embodiments, the remote unit 102 may perform sidelink communication using a predetermined sidelink discontinuous reception configuration during the sidelink unicast establishment procedure. In various embodiments, the remote unit 102 may, in response to receiving a direct communication accept message, perform sidelink communication based on a set of sidelink discontinuous reception configurations. Accordingly, a remote unit 102 may be used for sidelink discontinuous reception configuration.

In some embodiments, a remote unit 102 (e.g., a second user equipment) may receive information indicating initiation of a sidelink unicast establishment procedure with a first user equipment (e.g., remote unit 102). In certain embodiments, the remote unit 102 may perform sidelink communication using a predetermined sidelink discontinuous reception configuration during the sidelink unicast establishment procedure. In various embodiments, the remote unit 102 may, in response to transmitting a direct communication accept message, perform sidelink communication based on a set of sidelink discontinuous reception configurations. Accordingly, a remote unit 102 may be used for sidelink discontinuous reception configuration.

Figure 2:
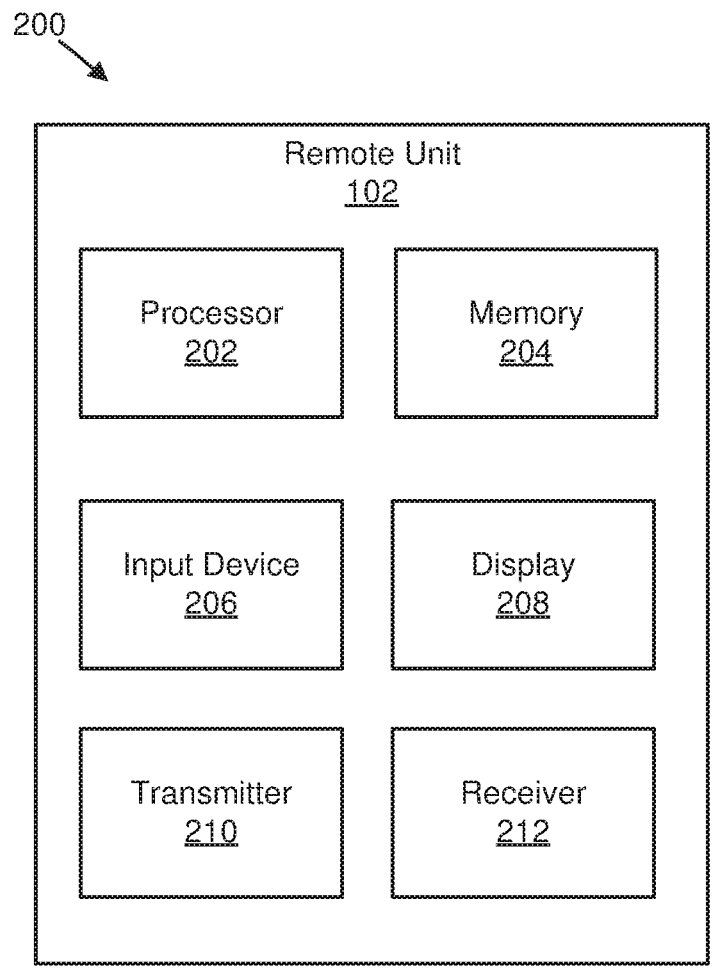
FIG. 2 is a schematic block diagram illustrating one embodiment of an apparatus that may be used for sidelink discontinuous reception configuration.

FIG. 2 depicts one embodiment of an apparatus 200 that may be used for sidelink discontinuous reception configuration. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an liquid crystal display ("LCD"), an light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In one embodiment, the processor 202 may: initiate a sidelink unicast establishment procedure with a second user equipment; perform sidelink communication using a predetermined sidelink discontinuous reception configuration during the sidelink unicast establishment procedure; and, in response to receiving a direct communication accept message, perform sidelink communication based on a set of sidelink discontinuous reception configurations.

In various embodiments, the receiver 212 may receive information indicating initiation of a sidelink unicast establishment procedure with a first user equipment. In various embodiments, the processor 202 may: perform sidelink communication using a predetermined sidelink discontinuous reception configuration during the sidelink unicast establishment procedure; and, in response to transmitting a direct communication accept message, perform sidelink communication based on a set of sidelink discontinuous reception configurations.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
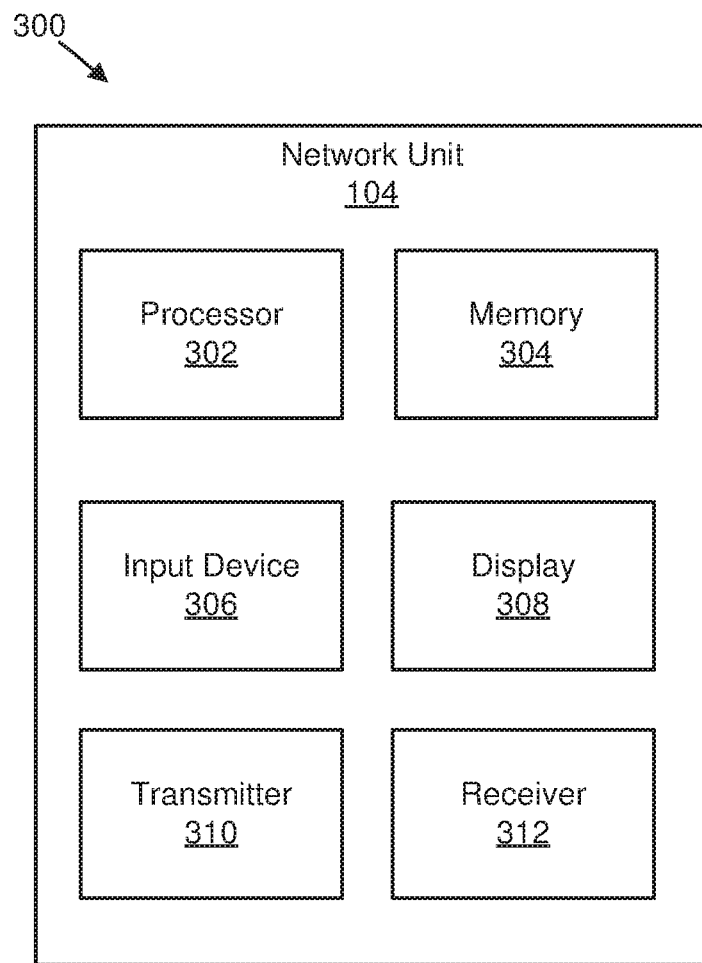
FIG. 3 is a schematic block diagram illustrating another embodiment of an apparatus that may be used for sidelink discontinuous reception configuration.

FIG. 3 depicts another embodiment of an apparatus 300 that may be used for sidelink discontinuous reception configuration. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

Although only one transmitter 310 and one receiver 312 are illustrated, the network unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

While a number of embodiments are described herein, any embodiments described herein may be combined with other embodiments described herein as long as the features of the embodiments are not mutually exclusive. In certain embodiments, it may not be clear which DRX configuration is used during a sidelink ("SL") unicast establishment procedure and during a time period after a SL unicast link has been established until the DRX configuration is configured between peer UEs of the SL unicast link used. In such embodiments, peer UEs DRX ActiveTimes may be aligned so that they are able to transmit and/or receive a UE to UE interface ("PC5") RRC message during a SL RRCReconfiguration procedure used to configure the DRX configuration.

In some embodiments, such as for NR Uu operation, a drx-InactivityTimer timer may not be started for DL SPS transmissions. In various embodiments, a UE starts a drx-HARQ-RTT-TimerDL for a corresponding hybrid automatic repeat request ("HARQ") process in a first symbol after an end of a corresponding transmission carrying DL HARQ feedback. Similar behavior may be used for UL configured grant transmissions. In certain embodiments, since for SL transmissions on a PC5 interface sidelink control information ("SCI") is transmitted along with PSSCH, a UE may start a SLdrx-InactivityTimer timer for SL resources allocated by a sidelink ("SL") configured grant ("CG"). In such embodiments, a receiver ("RX") UE may not be aware of SL CG allocations. In various embodiments, starting a SLdrx-InactivityTimer timer for SL CG transmission may lead to increased power consumption since DRX ActiveTime may be unnecessarily extended.

In various embodiments, each SL logical channel ("LCH"), SL service, SL application, and/or SL destination may be associated with a preconfigured and/or fixed SL-DRX-configuration (e.g., which may be defined as a combination of offset_std_On-duration, On-duration-timer, and/or periodicity). In some embodiments, a SL On-duration starts at a fixed time offset (e.g., offset_std_On-duration) from Time_0 based on a synchronization source from a global navigation satellite system ("GNSS"), a gNB directly, or indirectly from sidelink synchronization signals ("SLSS"). In certain embodiments, an On-duration-timer may be restarted periodically with a periodicity. It should be noted that the term SL "ActiveTime" may refer to a time period in which a SL UE transmits and receives data and/or control on a PC5 interface.

In some embodiments, a predefined, common PC5 5G QoS indicator ("5QI") ("PQI"), and/or destination-specific SL DRX pattern and/or configuration may facilitate SL data transmissions for a specific application, service, destination, and/or LCH being synchronized between UEs interested in the service and/or application. In such embodiments, a TX side of a UE may need to be aware of when RX UEs are listening for data from a specific SL LCH and/or application and an RX side of the UE may need to know when to monitor for SL data and/or control of a specific SL LCH and/or application. In various embodiments, a SL DRX pattern and/or configuration may improve a UE's power consumption, as a UE interested in a particular SL service and/or application may only need to be active on a PC5 interface (e.g., monitor for SCI and/or PSSCH) at specific predetermined time periods. In certain embodiments, it may be possible for a sidelink UE to use two separate DRX patterns and/or ActiveTimes (e.g., one DRX pattern and/or ActiveTime defining when the SL UE (TX side) is allowed to transmit SL data and/or control on a PC5 interface to a peer UE and another separate DRX pattern and/or ActiveTime defining when the same SL UE (RX UE) is to receive SL data and/or control from the peer UE). It should be noted that embodiments described herein may be applicable to different approaches (e.g., one common DRX pattern and/or ActiveTime per sidelink UE or two separate DRX patterns and/or ActiveTime per SL UE—one for TX side and one for RX side).

In certain embodiments, a common, predefined, and/or preconfigured DRX configuration for PC5 control signaling may be used to specify time periods (e.g., DRX ActiveTimes) for which PC5 control signaling is exchanged (e.g., between peer UEs of a unicast connection (RX and/or TX UE)). In such embodiments, the control signaling may be for PC5 RRC signaling and/or PC5-S signaling. In some embodiments, PC5 control signaling is treated with respect to the DRX behavior and/or configuration similar to a vehicle to everything ("V2X") service (e.g., a SL and/or V2X service may have an associated DRX configuration). In various embodiments, a UE may have one or more DRX configurations associated with V2X services and/or QoS flows and one or more DRX configurations for PC5 control signaling. In certain embodiments, PC5 RRC signaling may be done over a sidelink signaling radio bearer ("SRB") on a logical channel SCCH. In some embodiments, a common DRX configuration for SL SRBs may be predefined and/or preconfigured. In such embodiments, the predefined DRX configuration may be used for the exchange of signaling messages for establishing a PC5-RRC connection which is initiated after a corresponding unicast link has been established. Moreover, in such embodiments, the common DRX configuration may be derived by a SL UE based on an L2 destination ID. In some embodiments, an RX and TX UE of a unicast link may use a common and/or preconfigured DRX configuration to receive and/or transmit PC5 RRC messages associated with a PC5 unicast link. In such embodiments, the PC5 RRC messages of a SL RRC reconfiguration procedure for configuring a SL DRX configuration used between the RX and/or TX UE of the unicast link (e.g., pair of source and/or destination) may be transmitted and/or received within DRX ActiveTimes based on a predefined and/or preconfigured DRX configuration.

Figure 4:
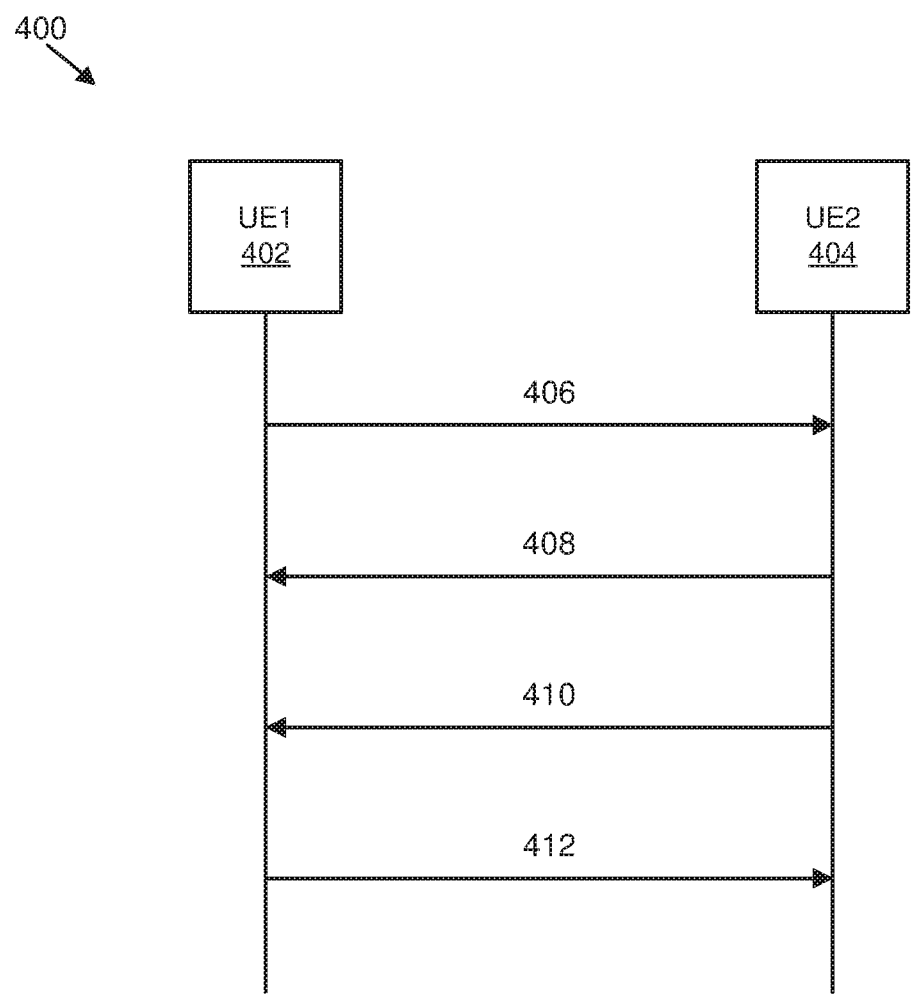
FIG. 4 is a communications diagram illustrating one embodiment of communications having a sidelink discontinuous reception configuration.

FIG. 4 is a communications diagram illustrating one embodiment of communications 400 having a sidelink discontinuous reception configuration. The communications 400 include messages transmitted between a UE1 402 and a UE2 404. Each of the communications 400 may include one or more messages.

In a first communication 406 transmitted from the UE1 402 to the UE2 404, the UE1 402 transmits an RRCReconfigurationSidelink message for DRX of UE2 404 to the UE2 404. In a second communication 408 transmitted from the UE2 404 to the UE1 402, the UE2 404 transmits an RRCReconfigurationCompleteSidelink message to the UE1 402. In a third communication 410 transmitted from the UE2 404 to the UE1 402, the UE2 404 transmits an RRCReconfigurationSidelink message for DRX of UE1 402 to the UE1 402. In a fourth communication 412 transmitted from the UE1 402 to the UE2 404, the UE1 402 transmits an RRC ReconfigurationCompleteSidelink message to the UE2 404.

In various embodiments, one predefined and/or preconfigured DRX configuration may be used by SL UEs for transmission and/or reception of SL SRB0, SL SRB1, and SL SRB2 messages. In such embodiments, another predefined and/or preconfigured DRX configuration may be used for transmission and/or reception of SL SRB3 messages (e.g., PC5 RRC signaling).

In certain embodiments, a common, predefined, and/or preconfigured DRX configuration may be used for transmission and/or reception of PC5-S messages until PC5-S security has been established. In such embodiments, during establishment of a unicast link (e.g., layer-2 link establishment procedure), an initiating UE (TX UE) sends a direct communication request ("DCR") message to initiate the unicast link (e.g., layer-2 link establishment procedure). The DCR message may be sent according to a common, predefined, and/or preconfigured DRX configuration (e.g., DCR message may be sent during DRX ActiveTime to ensure that a peer UE is able to receive the DCR message (e.g., the peer UE is in ActiveTime monitoring SCI and/or physical sidelink shared channel ("PSCCH"))). In some embodiments, a common DRX configuration may be derived from an L2 destination ID. In various embodiments, for initiating a unicast communication, one sidelink SRB (e.g., SL-SRB0) may be used to transmit PC5-S messages before PC5-S security has been established. In such embodiments, one sidelink SRB (e.g., SL-SRB1) may be used to transmit the PC5-S messages to establish the PC5-S security. Moreover, in such embodiments, one sidelink SRB (e.g., SL-SRB2) may be used to transmit the PC5-S messages after the PC5-S security has been established (e.g., which is protected). Further, in such embodiments, one sidelink SRB (e.g., SL-SRB3) may be used to transmit PC5-RRC signaling (e.g., which is protected and only sent after the PC5-S security has been established). In certain embodiments, a predefined and/or preconfigured DRX configuration may be used for transmission and/or reception of SL-SRB0 and SL-SRB1 during a unicast link establishment procedure until and including at least a security mode command message. In such embodiments, the same DRX configuration may be used for security mode complete message transmission and/or reception. Moreover, in such embodiments, the security mode command message includes some QoS information (e.g., information about PC5 QoS flows requested by an initiating UE (TX UE)). For each PC5 QoS flow, a packet format information ("PFI"), corresponding PC5 QoS parameters (e.g., PQI and/or other parameters such as maximum flow bit rate ("MFBR") and/or guaranteed flow bit rate ("GFBR")), and/or associated V2X service types may be included. In various embodiments, in response to transmission and/or reception of a security mode command message, a peer and/or receiver UE of a unicast link may apply DRX configurations predefined and/or preconfigured for QoS flows (e.g., PQIs associated with the QoS flows—for each PQI a common, predefined, and/or preconfigured DRX configuration may be used).

In some embodiments, a common, predefined, and/or preconfigured DRX configuration may be used for transmission and/or reception of SL-SRB0, SL-SRB1, and SL-RB2 during a unicast link establishment procedure until and including a direct communication accept ("DCA") message is sent and/or received. In one embodiment, a common, preconfigured, and/or known SL DRX configuration may be derived based on an L2 destination ID. In certain embodiments, a DCA message includes QoS information (e.g., information about PC5 QoS flows requested by an initiating UE (TX UE) for each PC5 QoS flow, a PFI, corresponding PC5 QoS parameters (e.g., PQI and/or other parameters such as MFBR and/or GFBR), and/or associated V2X service types). In various embodiments, in response to transmission and/or reception of a DCA message, peer UEs of a unicast link may apply DRX configurations predefined and/or preconfigured for QoS flows, e.g., the QoS flows signaled within the DCA message (e.g., PQIs associated with the QoS flows—for each PQI a predefined and/or preconfigured DRX configuration may be used). As described in relation to FIG. 5, predefined SL DRX configurations may be used (e.g., derived based on PQI of established QoS-flows and/or SL RBs) until peer UEs configure a different DRX configuration using a RRCReconfigurationSidelink procedure (e.g., until reception of a RRCReconfigurationSidelink complete message).

Figure 5:
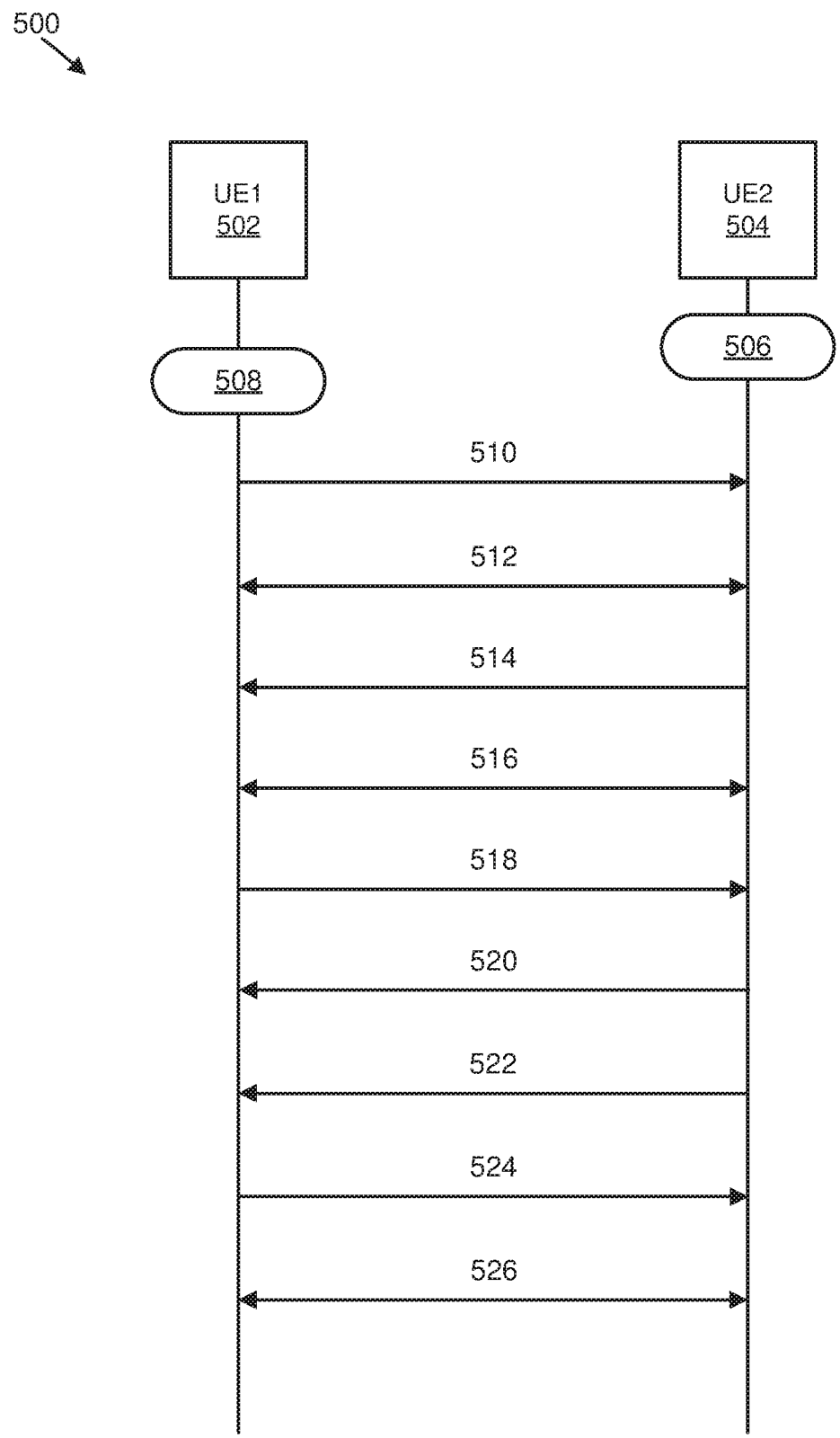
FIG. 5 is a communications diagram illustrating another embodiment of communications having a sidelink discontinuous reception configuration.

FIG. 5 is a communications diagram illustrating another embodiment of communications 500 having a sidelink discontinuous reception configuration. The communications 500 include messages transmitted between a UE1 502 and a UE2 504. Each of the communications 500 may include one or more messages.

The UE2 504 may determine 506 a destination layer-2 ID for signaling reception. The UE1 502 may have a V2X application layer that provides 508 application information for PCF unicast communication. In a first communication 510 transmitted from the UE1 502 to the UE2 504, the UE1 502 transmits a DCR (e.g., broadcast or unicast) to the UE2 504. In a second communication 512 transmitted between the UE1 502 and the UE2 504, security establishment messages may be transmitted. In a third communication 514 transmitted from the UE2 504 to the UE1 502, the UE2 504 transmits a direct communication accept message (e.g., unicast) to the UE1 502. In a fourth communication 516 transmitted between the UE1 502 and the UE2 504, V2X service data may be transmitted over a unicast link. It should be noted that UE oriented layer-2 link establishment occurs via the second communication 512, the third communication 514, and the fourth communication 516. Moreover, the first communication 510, the second communication 512, and the third communication 514 may be performed using a common and/or preconfigured DRX configuration (e.g., a DRX configuration not related to QoS and/or PQI).

In a fifth communication 518 transmitted from the UE1 502 to the UE2 504, the UE1 502 transmits an RRCReconfigurationSidelink message for DRX of UE2 504 to the UE2 504. In a sixth communication 520 transmitted from the UE2 504 to the UE1 502, the UE2 504 transmits an RRCReconfigurationCompleteSidelink message to the UE1 502. In a seventh communication 522 transmitted from the UE2 504 to the UE1 502, the UE2 504 transmits an RRCReconfigurationSidelink message for DRX of UE1 502 to the UE1 502. In an eighth communication 524 transmitted from the UE1 502 to the UE2 504, the UE1 502 transmits an RRCReconfigurationCompleteSidelink message to the UE2 504. It should be noted that DRX fine-tuning occurs via the fifth communication 518, the sixth communication 520, the seventh communication 522, and the eighth communication 524. Moreover, the fourth communication 516, the fifth communication 518, the sixth communication 520, the seventh communication 522, and the eighth communication 524 may be performed using preconfigured DRX configuration (s) associated with PQI(s) and/or QoS flow(s), e.g., Qos-flow(s) and/or PQI(s) signaled within the third communication 514 direct communication accept message (e.g., a set of DRX configurations). In a ninth communication 526 transmitted between the UE1 502 and the UE2 504, V2X service data may be transmitted over a unicast link using a dedicated DRX configuration for the unicast link.

In some embodiments, a common, predefined, and/or preconfigured DRX configuration may be used by peer UEs when establishing a unicast link between the peer UEs (e.g., layer-2 link establishment procedure). In one embodiment, a preconfigured DRX configuration may be used for transmission and/or reception of a DCR message, a security establishment procedure, and/or a DCA message. In certain embodiments, a preconfigured DRX configuration may be used by peer UEs after SL unicast establishment (e.g., for transmission and/or reception of SL service data) until the peer UEs configure a different DRX configuration using a SL RRCReconfiguration procedure (e.g., until reception of a SL RRCReconfiguration complete message). In various embodiments, a predefined DRX configuration may be used for a SL RRCReconfiguration procedure to configure and/or fine-tune the DRX configuration between peer UEs for a PC5 unicast link. In some embodiments, a predefined and/or preconfigured DRX configuration may be based on a PQI of service data. In certain embodiments, a receiver (e.g., of DCR) may anticipate which QoS flows, profiles, and/or PQIs (e.g., services, service types, and/or applications and their messages, data, and so forth) the receiver expects to receive and/or monitor corresponding DRX configurations. In various embodiments, to facilitate receiver knowledge of expected PQIs, a preconfigured list of V2X service identifier to PC5 QoS parameters mapping rules may be used. In some embodiments, a UE (e.g., transmitter and receiver) may be configured with default values for PC5 QoS parameters for a particular service (e.g., identified by public service ID ("PSID") and/or intelligent transport system application identifier ("ITS-AID")). In certain embodiments, a default value may be used if a corresponding PC5 QoS parameter is not provided by an upper layer. In various embodiments, since expected PSID and/or ITS-AID services may be known to a receiver and mapped to a default QoS, the receiver of a potential DCR may be able to expect and monitor transmissions of certain PQIs. As may be appreciated, an ability for a receiver UE to expect and/or monitor PQIs may not be limited to unicast communication but may be used by a potential receiver of a groupcast or broadcast communication.

Figure 6:
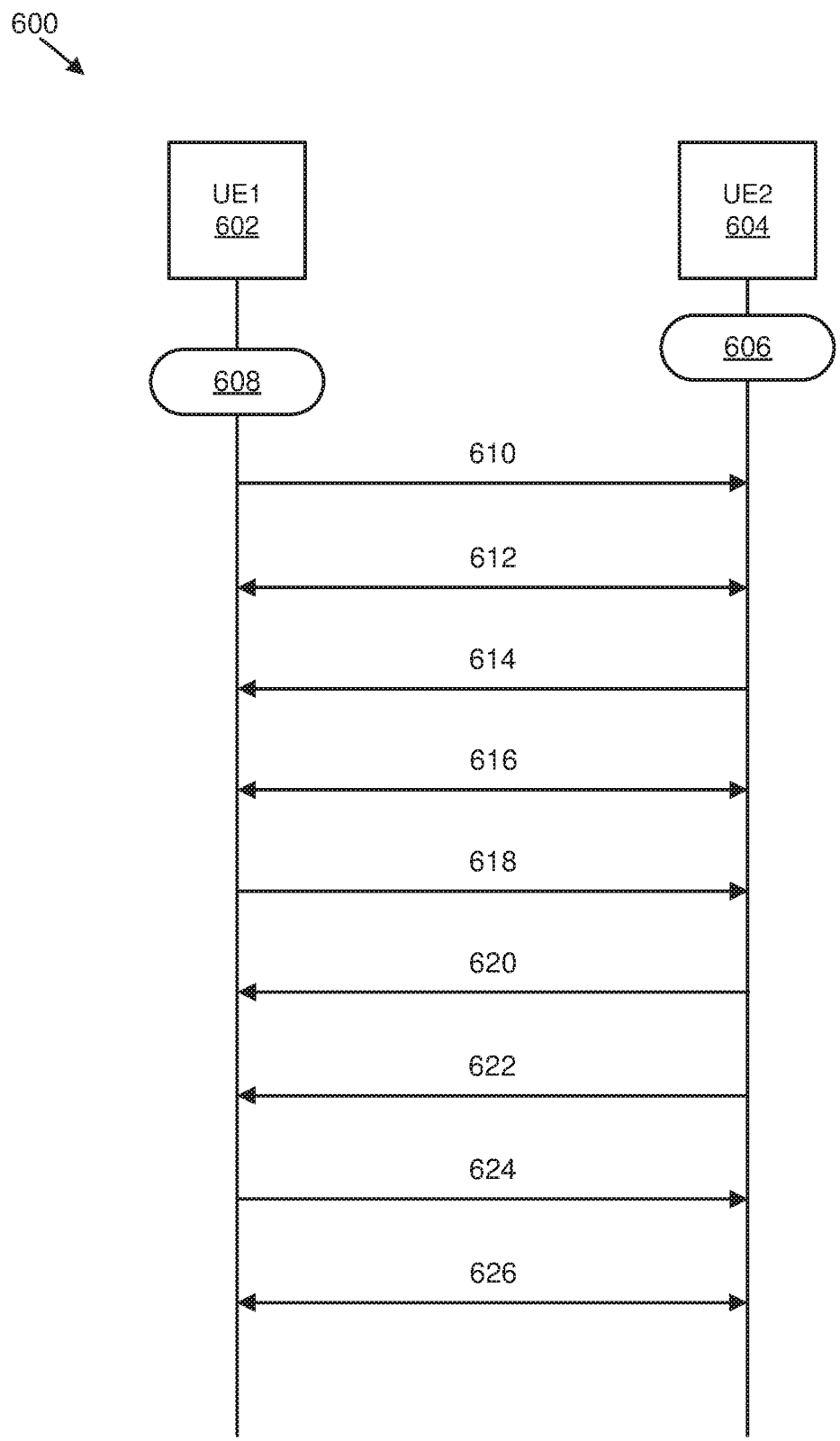
FIG. 6 is a communications diagram illustrating a further embodiment of communications having a sidelink discontinuous reception configuration.

FIG. 6 is a communications diagram illustrating a further embodiment of communications 600 having a sidelink discontinuous reception configuration. The communications 600 include messages transmitted between a UE1 602 and a UE2 604. Each of the communications 600 may include one or more messages.

The UE2 604 may determine 606 a destination layer-2 ID for signaling reception. The UE1 602 may have a V2X application layer that provides 608 application information for PCF unicast communication. In a first communication 610 transmitted from the UE1 602 to the UE2 604, the UE1 602 transmits a DCR (e.g., broadcast or unicast) to the UE2 604. In a second communication 612 transmitted between the UE1 602 and the UE2 604, security establishment messages may be transmitted. In a third communication 614 transmitted from the UE2 604 to the UE1 602, the UE2 604 transmits a direct communication accept message (e.g., unicast) to the UE1 602. In a fourth communication 616 transmitted between the UE1 602 and the UE2 604, V2X service data may be transmitted over a unicast link. It should be noted that UE oriented layer-2 link establishment occurs via the second communication 612, the third communication 614, and the fourth communication 616.

In a fifth communication 618 transmitted from the UE1 602 to the UE2 604, the UE1 602 transmits an RRCReconfigurationSidelink message for DRX of UE2 604 to the UE2 604. In a sixth communication 620 transmitted from the UE2 604 to the UE1 602, the UE2 604 transmits an RRCReconfigurationCompleteSidelink message to the UE1 602. In a seventh communication 622 transmitted from the UE2 604 to the UE1 602, the UE2 604 transmits an RRCReconfigurationSidelink message for DRX of UE1 602 to the UE1 602. In an eighth communication 624 transmitted from the UE1 602 to the UE2 604, the UE1 602 transmits an RRCReconfigurationCompleteSidelink message to the UE2 604. It should be noted that DRX fine-tuning occurs via the fifth communication 618, the sixth communication 620, the seventh communication 622, and the eighth communication 624. Moreover, the first communication 610, the second communication 612, the third communication 614, the fourth communication 616, the fifth communication 618, the sixth communication 620, the seventh communication 622, and the eighth communication 624 may be performed using a preconfigured DRX configuration (e.g., a DRX configuration not related to QoS and/or PQI). In a ninth communication 626 transmitted between the UE1 602 and the UE2 604, V2X service data may be transmitted over a unicast link using a dedicated DRX configuration for the unicast link.

In some embodiments, a time period after a SL unicast link has been established until a SL DRX configuration is configured per a pair of source and/or destination between a RX and TX UE (e.g., by means of a SL RRCReconfiguration procedure) may be considered DRX ActiveTime (e.g., no DRX is applied). In certain embodiments, PC5 RRC messages may be used for configuring a DRX configuration between an RX and TX UE for a unicast transmission which may be transmitted on SL SRB3 may be sent at any point of time. In various embodiments, in response to having transmitted an RRCReconfigurationCompleteSidelink message, a UE uses a DRX configuration configured between peer UEs for transmission and/or reception of PC5 control signaling (e.g., PC5 RRC signaling and/or PC5-S signaling).

In certain embodiments, a preconfigured and/or predefined DRX configuration may be used for transmission and/or reception of SL logical channels having a logical channel priority equal to 1. In various embodiments, SL SRBs are having the highest logical channel priority are SL SRBs having a logical channel priority set to 1. In some embodiments, a preconfigured and/or predefined DRX configuration may be used for SL SRBs.

In various embodiments, PC5 RRC signaling may be transmitted and/or received within DRX ActiveTimes configured for a unicast link. In some embodiments, a unicast communication link establishes a V2X service between peer UEs over a PC5 interface. In certain embodiments, V2X services running in a UE use a PC5 unicast link (e.g., PC5-RRC connection) as a logical link established between a pair of UEs to communicate between the pair of UEs. In various embodiments, a UE may have multiple PC5-RRC connections (e.g., unicast connections with one or more UEs for different services and/or pairs of source and destination L2 IDs). In such embodiments, the UE may use multiple DRX configurations concurrently (e.g., one DRX configuration per unicast link or one DRX configuration per V2X service, PQI, and/or destination ID). Moreover, in such embodiments, PC5 RRC signaling used for a PC5-RRC connection (e.g., unicast link) transmitted and/or received according to any of DRX configuration(s) used by a UE for a corresponding PC5 unicast link.

Figure 7:
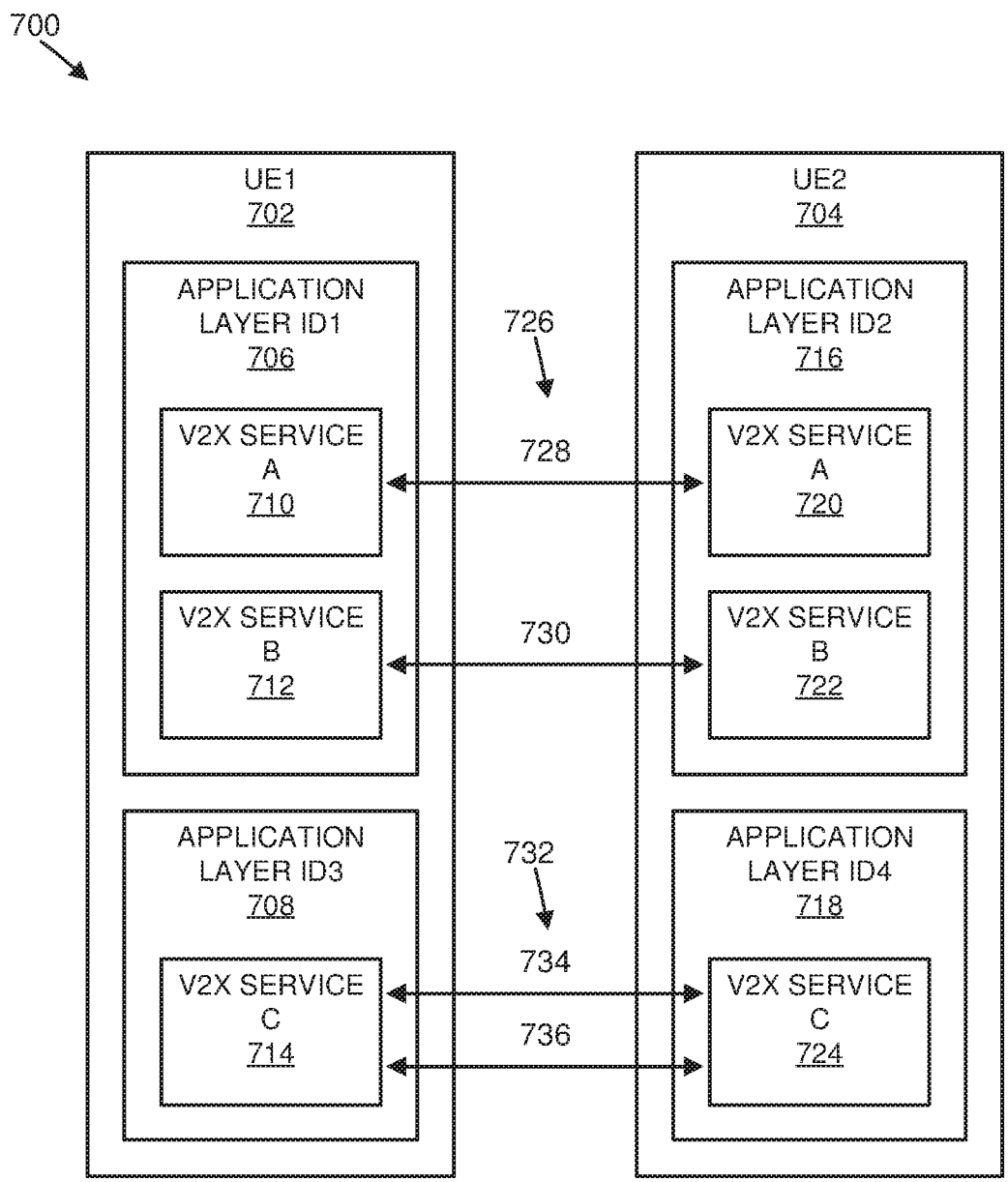
FIG. 7 is a communications diagram illustrating yet another embodiment of communications having a sidelink discontinuous reception configuration.

FIG. 7 is a communications diagram illustrating yet another embodiment of communications 700 having a sidelink discontinuous reception configuration. The communications 700 include messages transmitted between a UE1 702 and a UE2 704. Each of the communications 700 may include one or more messages. The UEs 702 and 704 may have multiple application layer IDs, resulting in potentially multiple PC5 links.

Specifically, the UE1 702 includes an application layer ID1 706 and an application layer ID3 708. Furthermore, the application layer ID1 706 includes a V2X service A 710 and a V2X service B 712. Moreover, the application layer ID3 708 includes a V2X service C 714. The UE2 704 includes an application layer ID2 716 and an application layer ID4 718. Furthermore, the application layer ID2 716 includes a V2X service A 720 and a V2X service B 722. Moreover, the application layer ID4 718 includes a V2X service C 724. A PC5 unicast link1 726 includes a PC5 QoS flow 1 728 and a PC5 QoS flow2 730. Moreover, a PC5 unicast link2 732 includes a PC5 QoS flow3 734 and a PC5 QoS flow4 736.

In various embodiments, unicast links may be between the same pair of UEs (e.g., different applications may be started to initiate such unicast links). In some embodiments, to receive and/or transmit PC5 RRC signaling used for the PC5 unicast link1 726, the UE1 702 and the UE2 704 may use any of the DRX configurations (e.g., DRX ActiveTimes) configured for the PC5 unicast link1 726 (e.g., there may be one DRX configuration for each QoS flow of the PC5 unicast link1 726).

In some embodiments, a field in SCI indicates whether an RX UE should start a SLdrx-inactivity timer, e.g., UE is in DRX ActiveTime while the SLdrx-inactivity timer is running, in response to the reception of the SCI. In such embodiments, since the RX UE is not aware of whether a SL resource has been allocated by a SL configured grant allocation (e.g., SL CG allocated by gNB (mode 1)) or allocated by a dynamic grant, the SCI indicates whether the SLdrx-inactivity timer should be started. It should be noted that for SL CG resources, the SLdrx-inactivity timer should not be started (e.g., similar to the Uu interface where Drx-inactivity is not started for SL semi-persistent scheduling ("SPS") transmissions). In Uu, a DRX Drx-inactivityTimer may not be started for DL SPS (e.g., CG) transmission. In various embodiments, drx-HARQ-RTT-TimerDL may be started after transmission of DL HARQ feedback (e.g., transmitted on physical uplink control channel ("PUCCH")).

In certain embodiments, if a MAC protocol data unit ("PDU") is received in a configured downlink assignment, then 1) start the drx-HARQ-RTT-TimerDL for the corresponding HARQ process in the first symbol after the end of the corresponding transmission carrying the DL HARQ feedback; and 2) stop the drx-RetransmissionTimerDL for the corresponding HARQ process.

In some embodiments, information about whether to start a SLdrx-inactivity timer in response to reception of SCI and/or physical sidelink shared channel ("PSSCH") carried within a 1st-stage SCI. In such embodiments, one of the reserved bits in the 1st-stage SCI may be used to carry the information.

In various embodiments, SCI may indicate whether a SL resource is a SL CG resource or a dynamically allocated SL resource. In one embodiment, an RX UE may start a SLdrx-inactivity timer in response to receiving SCI indicating dynamically allocated SL resources. In response to receiving SCI indicating that the corresponding SL resources (e.g., PSSCH) are dynamically allocated, the UE starts the SLdrx-inactivity timer. One embodiment of SCI (e.g., SCI format 1-A) is shown in Table 1.

TABLE 1

SCI Format 1-A

SCI format 1-A is used for the scheduling of PSSCH and $2^{nd}$-stage-SCI on PSSCH
The following information is transmitted by means of the SCI format 1-A:
  Priority - 3 bits as specified in clause 5.4.3.3 of [12, TS 23.287] and clause 5.22.1.3.1 of [8, TS 38.321].
  Frequency resource assignment $$-\left\lceil \log_2\left(\frac{N_{subChannel}^{SL}(N_{subChannel}^{SL}+1)}{2}\right)\right\rceil$$

bits when the value of the higher layer parameter sl-MaxNumPerReserve is configured to 2; otherwise $$\left\lceil \log_2\left(\frac{N_{subChannel}^{SL}(N_{subChannel}^{SL}+1)(2N_{subChannel}^{SL}+1)}{6}\right)\right\rceil$$

bits when the value of the higher layer parameter sl-MaxNumPerReserve is configured to 3, as defined in clause 8.1.2.2 of [6, TS 38.214].
  Time resource assignment - 5 bits when the value of the higher layer parameter sl-MaxNumPerReserve is configured to 2; otherwise 9 bits when the value of the higher layer parameter sl-MaxNumPerReserve is configured to 3, as defined in clause 8.1.2.1 of [6, TS 38.214].
  Resource reservation period - $\lceil \log_2 N_{rsv\_period}\rceil$ bits as defined in clause 8.1.4 of [6, TS 38.214], where $N_{rsv\_period}$ is the number of entries in the higher layer parameter sl-ResourceReservePeriodList, if higher layer parameter sl-MultiReserveResource is configured; 0 bit otherwise.
  demodulation reference signal ("DMRS") pattern - $\lceil \log_2 N_{pattern}\rceil$ bits as defined in clause 8.4.1.1.2 of [4, TS 38.211], where $N_{pattern}$ is the number of DMRS patterns configured by higher layer parameter sl-PSSCH-DMRS-TimePatternList.
  $2^{nd}$-stage SCI format - 2 bits as defined in Table 8.3.1.1-1.
  Beta_offset indicator - 2 bits as provided by higher layer parameter sl-BetaOffsets2ndSCI and Table 8.3.1.1-2.
  Number of DMRS port - 1 bit as defined in Table 8.3.1.1-3.
  Modulation and coding scheme - 5 bits as defined in clause 8.1.3 of [6, TS 38.214].
  Additional modulation and coding scheme ("MCS") table indicator - as defined in clause 8.1.3.1 of [6, TS 38.214]: 1 bit if one MCS table is configured by higher layer parameter sl-Additional-MCS-Table; 2 bits if two MCS tables are configured by higher layer parameter sl- Additional-MCS-Table; 0 bit otherwise.
  physical sidelink feedback channel ("PSFCH") overhead indication - 1 bit as defined clause 8.1.3.2 of [6, TS 38.214] if higher layer parameter sl-PSFCH-Period = 2 or 4; 0 bit otherwise.
  Reserved - a number of bits as determined by higher layer parameter sl-NumReservedBits, with value set to zero.

In certain embodiments, a UE doesn't start a SLdrx-inactivity timer in response to receiving SCI indicating reserved resources (e.g., resource reservation period is set to a value different than 0). In some embodiments, such as for mode 2, a resource reservation period within SCI may be used to indicate SL resources for more than one transport block ("TB") (e.g., multiple MAC PDU transmission). In such embodiments, the SCI indicates reserved SL resources for multiple subsequent TBs, and the RX UE may not start the SL-drxinactivity timer. In such embodiments, a receiving UE may consider slots indicated in SCI as reserved resources for further transmission as discontinuous reception ("DRX") ActiveTime. Moreover, in such embodiments, a peer transmitter ("TX") UE may consider slots and/or subframes indicated within the SCI as DRX ActiveTime (e.g., TX UE is enabled to transmit in those sidelink slots).

Figure 8:
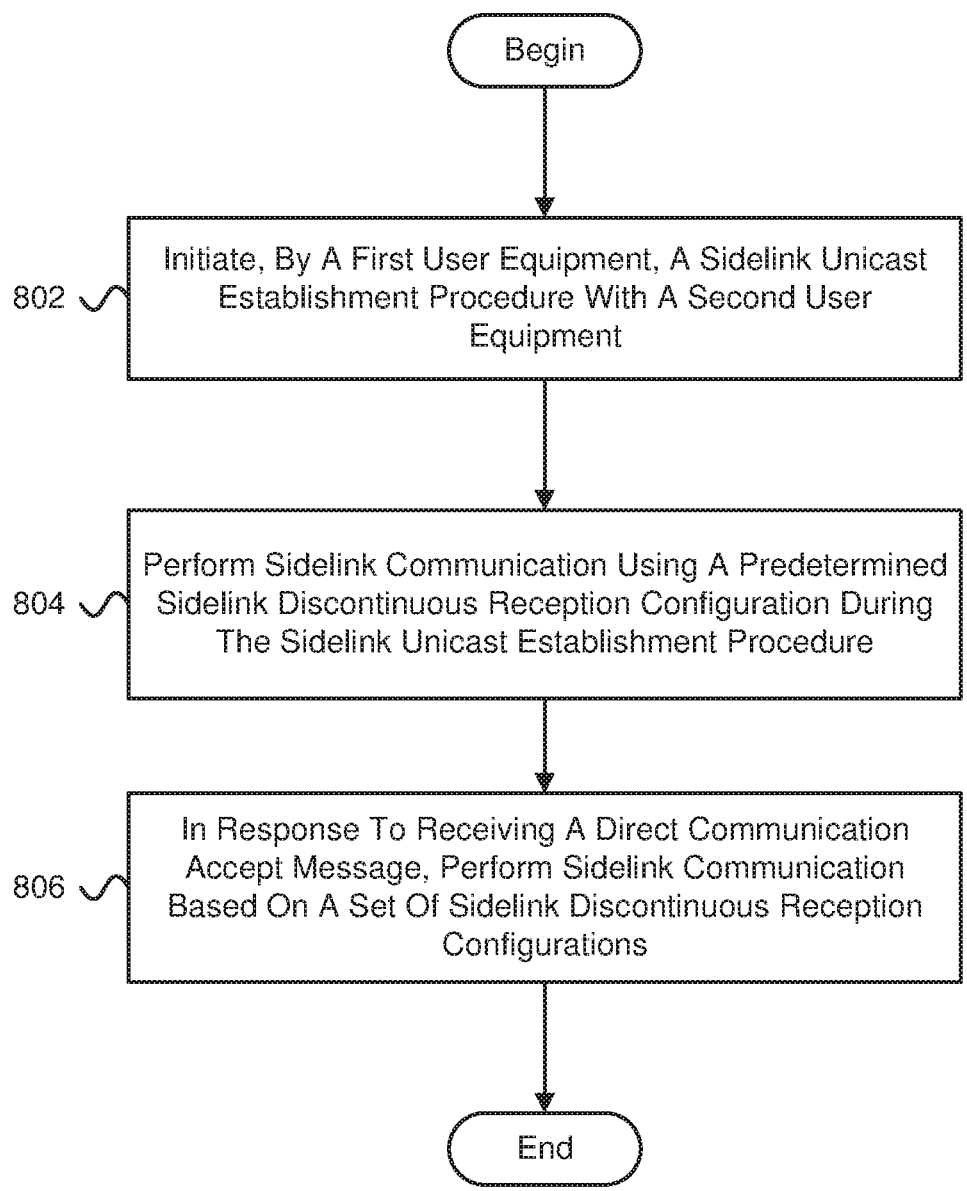
FIG. 8 is a schematic flow chart diagram illustrating one embodiment of a method for sidelink discontinuous reception configuration.

FIG. 8 is a schematic flow chart diagram illustrating one embodiment of a method 800 for sidelink discontinuous reception configuration. In some embodiments, the method 800 is performed by an apparatus, such as the remote unit 102. In certain embodiments, the method 800 may be performed by a processor executing program code, for example, a microcontroller, a microprocessor, a CPU, a GPU, an auxiliary processing unit, a FPGA, or the like.

The method 800 may include initiating 802, by a first user equipment, a sidelink unicast establishment procedure with a second user equipment. In certain embodiments, the method 800 includes performing 804 sidelink communication using a predetermined sidelink discontinuous reception configuration during the sidelink unicast establishment procedure. In various embodiments, the method 800 includes, in response to receiving a direct communication accept message, performing 806 sidelink communication based on a set of sidelink discontinuous reception configurations.

In certain embodiments, the predetermined sidelink discontinuous reception configuration is based on a destination identifier. In some embodiments, the set of sidelink discontinuous reception configurations are associated with a service identifier, PC5 quality of service parameters, a PC5 5G quality of service identifier, quality of service flow information, or a combination thereof.

In various embodiments, the set of sidelink discontinuous reception configurations correspond to: a quality of service class; an attribute of the quality of service class; a range of the attribute of the quality of service class; or some combination thereof. In one embodiment, the quality of service class is indicated by a quality of service class identifier, PC5 quality of service parameters, and a PC5 5G quality of service identifier, or a combination thereof.

Figure 9:
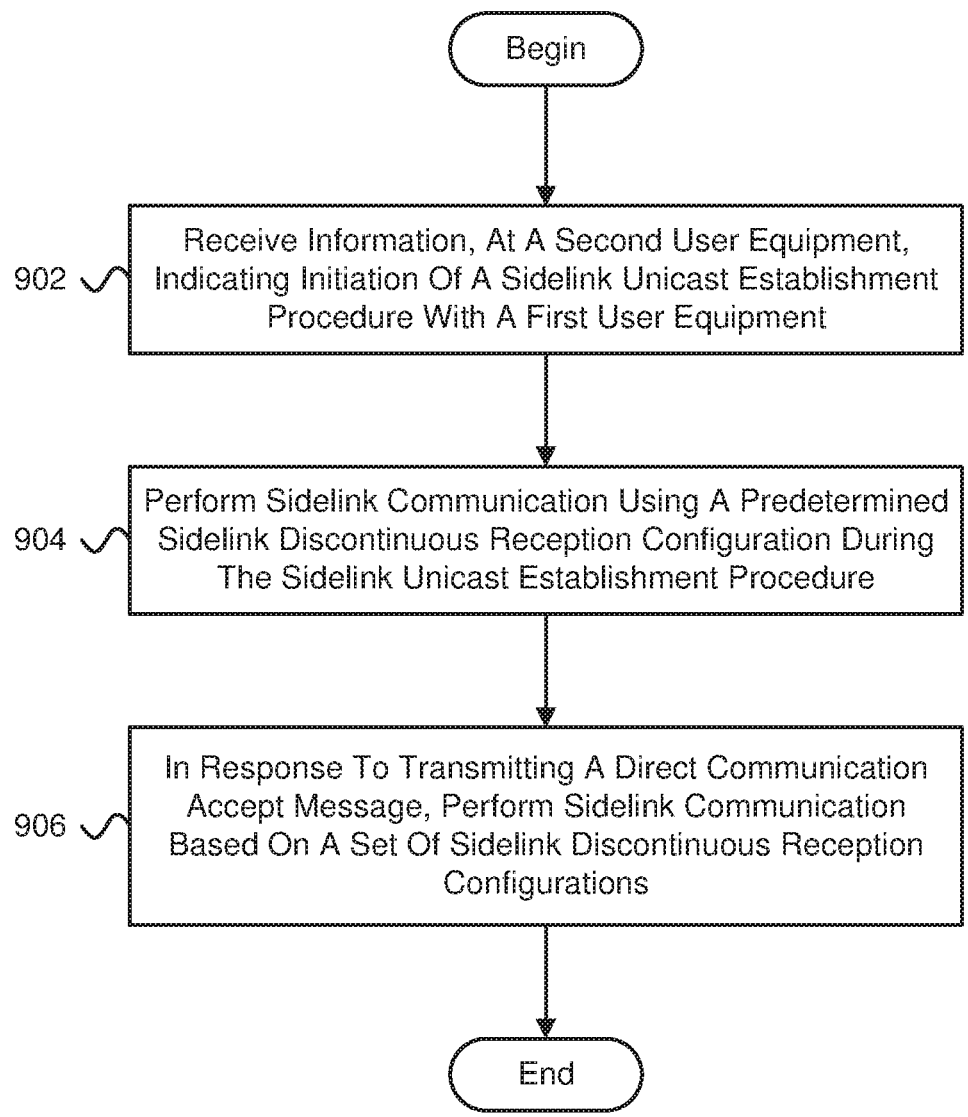
FIG. 9 is a schematic flow chart diagram illustrating another embodiment of a method for sidelink discontinuous reception configuration.

FIG. 9 is a schematic flow chart diagram illustrating another embodiment of a method 900 for sidelink discontinuous reception configuration. In some embodiments, the method 900 is performed by an apparatus, such as the remote unit 102. In certain embodiments, the method 900 may be performed by a processor executing program code, for example, a microcontroller, a microprocessor, a CPU, a GPU, an auxiliary processing unit, a FPGA, or the like.

The method 900 may include receiving 902 information, at a second user equipment, indicating initiation of a sidelink unicast establishment procedure with a first user equipment. In certain embodiments, the method 900 includes performing 904 sidelink communication using a predetermined sidelink discontinuous reception configuration during the sidelink unicast establishment procedure. In various embodiments, the method 900 includes, in response to transmitting a direct communication accept message, performing 906 sidelink communication based on a set of sidelink discontinuous reception configurations.

In certain embodiments, the predetermined sidelink discontinuous reception configuration is based on a destination identifier. In some embodiments, the set of sidelink discontinuous reception configurations are associated with a service identifier, PC5 quality of service parameters, a PC5 5G quality of service identifier, quality of service flow information, or a combination thereof.

In various embodiments, the set of sidelink discontinuous reception configurations correspond to: a quality of service class; an attribute of the quality of service class; a range of the attribute of the quality of service class; or some combination thereof. In one embodiment, the quality of service class is indicated by a quality of service class identifier, PC5 quality of service parameters, and a PC5 5G quality of service identifier, or a combination thereof.

In one embodiment, a method comprises: initiating, by a first user equipment, a sidelink unicast establishment procedure with a second user equipment; performing sidelink communication using a predetermined sidelink discontinuous reception configuration during the sidelink unicast establishment procedure; and in response to receiving a direct communication accept message, performing sidelink communication based on a set of sidelink discontinuous reception configurations.

In certain embodiments, the predetermined sidelink discontinuous reception configuration is based on a destination identifier.

In some embodiments, the set of sidelink discontinuous reception configurations are associated with a service identifier, PC5 quality of service parameters, a PC5 5G quality of service identifier, quality of service flow information, or a combination thereof.

In various embodiments, the set of sidelink discontinuous reception configurations correspond to: a quality of service class; an attribute of the quality of service class; a range of the attribute of the quality of service class; or some combination thereof.

In one embodiment, the quality of service class is indicated by a quality of service class identifier, PC5 quality of service parameters, and a PC5 5G quality of service identifier, or a combination thereof.

In one embodiment, an apparatus comprises a first user equipment. The apparatus further comprises: a processor that: initiates a sidelink unicast establishment procedure with a second user equipment; performs sidelink communication using a predetermined sidelink discontinuous reception configuration during the sidelink unicast establishment procedure; and, in response to receiving a direct communication accept message, performs sidelink communication based on a set of sidelink discontinuous reception configurations.

In certain embodiments, the predetermined sidelink discontinuous reception configuration is based on a destination identifier.

In some embodiments, the set of sidelink discontinuous reception configurations are associated with a service identifier, PC5 quality of service parameters, a PC5 5G quality of service identifier, quality of service flow information, or a combination thereof.

In various embodiments, the set of sidelink discontinuous reception configurations correspond to: a quality of service class; an attribute of the quality of service class; a range of the attribute of the quality of service class; or some combination thereof.

In one embodiment, the quality of service class is indicated by a quality of service class identifier, PC5 quality of service parameters, and a PC5 5G quality of service identifier, or a combination thereof.

In one embodiment, a method comprises: receiving information, at a second user equipment, indicating initiation of a sidelink unicast establishment procedure with a first user equipment; performing sidelink communication using a predetermined sidelink discontinuous reception configuration during the sidelink unicast establishment procedure; and in response to transmitting a direct communication accept message, performing sidelink communication based on a set of sidelink discontinuous reception configurations.

In certain embodiments, the predetermined sidelink discontinuous reception configuration is based on a destination identifier.

In some embodiments, the set of sidelink discontinuous reception configurations are associated with a service identifier, PC5 quality of service parameters, a PC5 5G quality of service identifier, quality of service flow information, or a combination thereof.

In various embodiments, the set of sidelink discontinuous reception configurations correspond to: a quality of service class; an attribute of the quality of service class; a range of the attribute of the quality of service class; or some combination thereof.

In one embodiment, the quality of service class is indicated by a quality of service class identifier, PC5 quality of service parameters, and a PC5 5G quality of service identifier, or a combination thereof.

In one embodiment, an apparatus comprises a second user equipment. The apparatus further comprises: a receiver that receives information indicating initiation of a sidelink unicast establishment procedure with a first user equipment; and a processor that: performs sidelink communication using a predetermined sidelink discontinuous reception configuration during the sidelink unicast establishment procedure; and, in response to transmitting a direct communication accept message, performs sidelink communication based on a set of sidelink discontinuous reception configurations.

In certain embodiments, the predetermined sidelink discontinuous reception configuration is based on a destination identifier.

In some embodiments, the set of sidelink discontinuous reception configurations are associated with a service identifier, PC5 quality of service parameters, a PC5 5G quality of service identifier, quality of service flow information, or a combination thereof.

In various embodiments, the set of sidelink discontinuous reception configurations correspond to: a quality of service class; an attribute of the quality of service class; a range of the attribute of the quality of service class; or some combination thereof.

In one embodiment, the quality of service class is indicated by a quality of service class identifier, PC5 quality of service parameters, and a PC5 5G quality of service identifier, or a combination thereof.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method comprising: A processor for wireless communication, comprising:
at least one controller coupled with at least one memory and configured to cause the processor to:
initiate, by a first user equipment (UE), a sidelink unicast establishment procedure with a second UE;
perform sidelink communication using a predetermined sidelink discontinuous reception (DRX) configuration during the sidelink unicast establishment procedure; and
in response to receiving a direct communication accept message, perform sidelink communication based on a set of sidelink DRX configurations.

2. The processor of claim 1, wherein the predetermined sidelink DRX configuration is based on a destination identifier (ID).

3. The processor of claim 1, wherein the set of sidelink DRX configurations are associated with a service identifier (ID), PC5 quality of service (QOS) parameters, a PC5 5G QoS ID, QoS flow information, or a combination thereof.

4. The processor of claim 1, wherein the set of sidelink DRX configurations correspond to:
a quality of service (QOS) class;
an attribute of the QoS class;
a range of the attribute of the QoS class; or
a combination thereof.

5. The processor of claim 4, wherein the quality of service (QOS) class is indicated by a QoS class identifier (ID), PC5 QoS parameters, and a PC5 5G QoS ID, or a combination thereof.

6. A first user equipment (UE), comprising:
at least one memory; and
at least one processor coupled with the at least one memory and configured to cause the first UE to:
initiate a sidelink unicast establishment procedure with a second UE;
perform sidelink communication using a predetermined sidelink discontinuous reception (DRX) configuration during the sidelink unicast establishment procedure; and
in response to receiving a direct communication accept message, perform sidelink communication based on a set of sidelink DRX configurations.

7. The first UE of claim 6, wherein the predetermined sidelink DRX configuration is based on a destination identifier (ID).

8. The first UE of claim 6, wherein the set of sidelink DRX configurations are associated with a service identifier (ID), PC5 quality of service (QOS) parameters, a PC5 5G QoS ID, QoS flow information, or a combination thereof.

9. The first UE of claim 6, wherein the set of sidelink DRX configurations correspond to:
a quality of service (QOS) class;
an attribute of the QoS class;
a range of the attribute of the QoS class; or
a combination thereof.

10. The first UE of claim 9, wherein the quality of service (QoS) class is indicated by a QoS class identifier (ID), PC5 QoS parameters, and a PC5 5G QoS ID, or a combination thereof.

11. A processor for wireless communication, comprising:
at least one controller coupled with at least one memory and configured to cause the processor to:
receive information, at a second user equipment (UE), indicating initiation of a sidelink unicast establishment procedure with a first UE;

perform sidelink communication using a predetermined sidelink discontinuous reception (DRX) configuration during the sidelink unicast establishment procedure; and in response to transmitting a direct communication accept message, perform sidelink communication based on a set of sidelink DRX configurations.

12. The processor of claim 11, wherein the predetermined sidelink DRX configuration is based on a destination identifier (ID).

13. The processor of claim 11, wherein the set of sidelink DRX configurations are associated with a service identifier (ID), PC5 quality of service (QOS) parameters, a PC5 5G QoS ID, QoS flow information, or a combination thereof.

14. The processor of claim 11, wherein the set of sidelink DRX configurations correspond to:
    a quality of service (QOS) class;
    an attribute of the QoS class;
    a range of the attribute of the QoS class; or
    a combination thereof.

15. The processor of claim 14, wherein the quality of service (QOS) class is indicated by a QoS class identifier (ID), PC5 QoS parameters, and a PC5 5G QoS ID, or a combination thereof.

16. A second user equipment (UE), comprising:
    at least one memory; and
    at least one processor coupled with the at least one memory and configured to cause the second UE to:
        receive information indicating initiation of a sidelink unicast establishment procedure with a first UE;
        perform sidelink communication using a predetermined sidelink discontinuous reception (DRX) configuration during the sidelink unicast establishment procedure; and
        in response to transmitting a direct communication accept message, perform sidelink communication based on a set of sidelink DRX configurations.

17. The second UE of claim 16, wherein the predetermined sidelink DRX configuration is based on a destination identifier (ID).

18. The second UE of claim 16, wherein the set of sidelink DRX configurations are associated with a service identifier (ID), PC5 quality of service (QOS) parameters, a PC5 5G QoS ID, QoS flow information, or a combination thereof.

19. The second UE of claim 16, wherein the set of sidelink DRX configurations correspond to:
    a quality of service (QOS) class;
    an attribute of the QoS class;
    a range of the attribute of the QoS class; or
    a combination thereof.

20. The second UE of claim 19, wherein the quality of service (QOS) class is indicated by a QoS class identifier (ID), PC5 QoS parameters, and a PC5 5G QoS ID, or a combination thereof.

* * * * *